(12) United States Patent
Östling et al.

(10) Patent No.: US 6,428,257 B2
(45) Date of Patent: Aug. 6, 2002

(54) LOCK NUT

(75) Inventors: Sture Östling; Uno Axelsson, both of Katrineholm (SE)

(73) Assignee: SKF Mekan AB, Katrineholm (SE)

( * ) Notice: Subject to any disclaimer, the term of this patent is extended or adjusted under 35 U.S.C. 154(b) by 0 days.

(21) Appl. No.: 09/779,569

(22) Filed: Feb. 9, 2001

(30) Foreign Application Priority Data

Feb. 10, 2000 (JP) .......................................... 2000-33133

(51) Int. Cl.[7] ............................ F16B 39/04; F16B 35/00
(52) U.S. Cl. ........................ 411/295; 411/296; 411/393; 411/941
(58) Field of Search ................................ 411/294, 295, 411/393, 298, 300, 452, 296, 941

(56) References Cited

U.S. PATENT DOCUMENTS

| | | | | |
|---|---|---|---|---|
| 2,251,202 A | * | 7/1941 | Purtell | ......................... 411/452 |
| 4,227,560 A | * | 10/1980 | Karlsson | ..................... 411/295 |
| 4,436,468 A | * | 3/1984 | Ozaki et al. | ............ 411/295 X |

FOREIGN PATENT DOCUMENTS

GB    1561946    3/1980

* cited by examiner

*Primary Examiner*—Neill Wilson
(74) *Attorney, Agent, or Firm*—Burns, Doane, Swecker & Mathis, L.L.P.

(57) ABSTRACT

A locking nut includes a threaded main bore for receiving a threaded portion and a number of oblique bores in each of which is positioned a locking pin having a forward end for engagement against the threaded portion. The oblique bore and the associated locking pin have a common longitudinal axis extending at generally the same angle to the axis of the threaded main bore as one of the flanks of the thread of the threaded main bore so that the forward end of the locking nut has at least one flank generally parallel to the longitudinal axis and lying parallel to the portions of the one flank of the threaded main bore adjacent the inner end of the oblique bore. Each locking nut is generally cylindrical and possesses an outer surface that is grooved or serrated to facilitate insertion of the locking nut into the respective oblique bore.

11 Claims, 1 Drawing Sheet

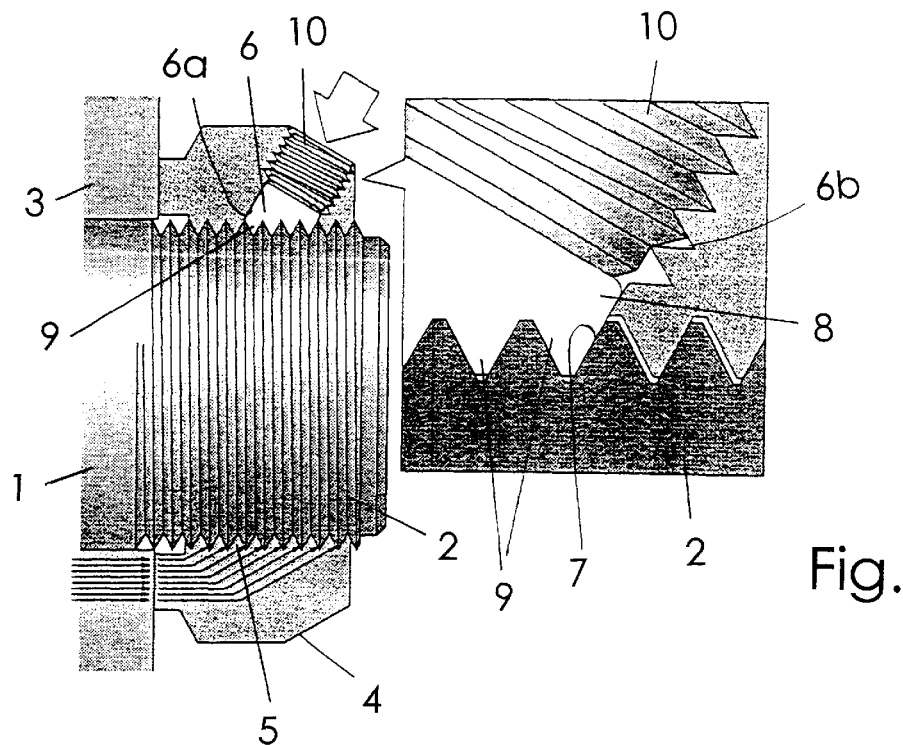
Fig. 1
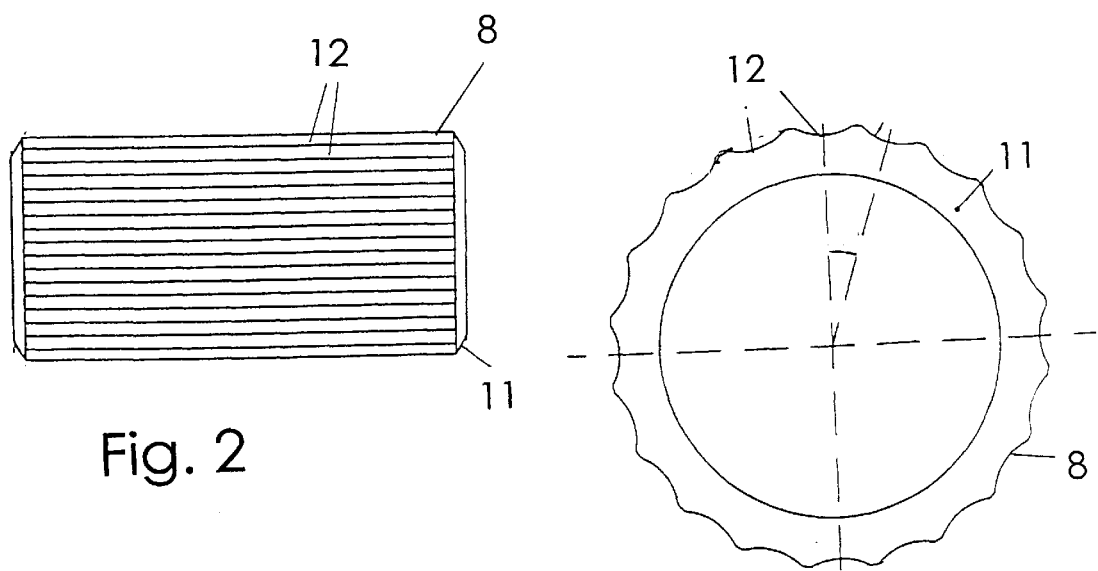
Fig. 2
Fig. 3

LOCK NUT

This application is based on and claims priority under 35 U.S.C. §119 with respect to Japanese Application No. 2000-33133 filed on Feb. 10, 2000, the entire content of which is incorporated herein by reference.

FIELD OF THE INVENTION

The present invention generally relates to a lock nut. More particularly, the present invention pertains to a lock nut of the type having a threaded main bore for receiving a threaded portion and a number of oblique bores in each of which is inserted a locking pin for engagement with its forward end against the threaded portion.

BACKGROUND OF THE INVENTION

A known lock nut is described in UK Patent No. 1,561,946. The purpose of the disclosed lock nut construction is to provide a lock nut with substantially the same locking effect even after repeated use. The lock nut includes a threaded main bore and brass locking pins each shaped as a cylindrical dowel having a smooth outer surface. The locking faces of the pins and the thread of the main bore are machined in the same machining operation. That is, the pins am inserted in their respective oblique bores with the forward end of each locking pin projecting into the not yet threaded main bore of the lock nut. This lock nut is then clamped in a clamping device and is subjected to thread cutting, whereby also the forward ends of the locking pins are cut to form at least one flank each.

When the lock nut is to be arrested to the threaded portion, each locking pin is tightened against the threaded portion by way of a grub screw or the like. The locking faces of the pins are thus pressed against the thread flanks of the threaded portion to give a locking effect provided entirely by friction forces, thereby avoiding deformation of the locking pin. This type of lock nut has proven to provide a reliable and efficient locking effect.

To ascertain that the locking pins are safely retained in their respective oblique bores during the thread cutting operation and afterwards when the lock nut is screwed up on the threaded portion, and without risking that the brass pins move axially in the bores or angularly about their longitudinal axis, it is necessary that each pin fit very snugly into its bore. This means that the fitting of the pins in their respective oblique bores in the lock nut is difficult, and the material forming the pins seizes against the inner surface of the oblique bore.

In light of the foregoing, a need exists for a locking nut that is not as susceptible to the problems and difficulties discussed above.

SUMMARY OF THE INVENTION

According to one aspect of the invention, a locking nut possesses a threaded main bore for receiving a threaded portion, with the threaded main bore having an axis and with the thread of the threaded main bore being defined by flanks. The lock nut also includes a plurality of oblique bores in each of which is positioned a respective locking pin having a forward end adapted to engage against the threaded portion, with the forward end of the locking pin being provided with at least one flank. Each oblique bore and the respective locking pin have a common longitudinal axis extending at substantially the same angle to the axis of the threaded main bore as one of the flanks of the thread of the threaded main bore so that the least one flank of the locking pin at the forward end of the locking pin is substantially parallel to said longitudinal axis and lies substantially parallel to portions of said one flank of said threaded main bore adjacent an inner end of the oblique bore. The locking pin is in the from of a substantially cylindrical body having along its outer surface a plurality of evenly spaced apart axially extending serrations that facilitate introduction of the locking pin into its respective bore.

Another aspect of the invention involves the combination of a shaft, a machine member and a locking nut that locks the machine member to the shaft. The locking nut has a main bore provided with an internal thread defined by flanks, and at least a portion of the shaft is positioned in the main bore so that an external thread on the shaft engages the internal thread in the main bore. The lock nut including at least one through bore that is obliquely oriented relative to the main bore and that opens into the main bore. The through bore has an unthreaded first bore portion and a threaded second bore portion, with the first bore portion being located between the main bore and the second bore portion. A locking pin is positioned in the first portion of the through bore and has a forward end that engages the externally threaded portion of the shaft. The forward end of the locking pin has a thread defined by flanks, and at least one flank of the thread of the locking pin at the forward end of the locking pin is substantially parallel to one flank of the threaded main bore adjacent an inner end of the oblique bore. The locking pin is substantially cylindrical and has a plurality of circumferentially spaced apart and axially extending grooves provided in its outer surface. A screw is positioned in the through bore and threadably engages the second portion of the through bore for urging the locking pin towards the shaft.

Another aspect of the invention involves a locking nut which locks a machine member to a shaft, wherein the shaft has an externally threaded portion. The locking nut has a main bore in which is positioned the externally threaded portion of the shaft. The main bore including a thread defined by flanks, and the lock nut includes at least one oblique bore in which is positioned a locking pin having a forward end that engages against the externally threaded portion of the shaft. The forward end of the locking pin has a thread defined by flanks. The the oblique bore and the locking pin have a common longitudinal axis extending at substantially the same angle to the axis of the threaded main bore as one of the flanks of the thread of the threaded main bore so that at least one flank of the thread of the locking pin at the forward end of the locking pin is lies substantially parallel to portions of said one flank of said threaded main bore adjacent an inner end of the oblique bore. The locking pin is substantially cylindrical and has a plurality of axially extending grooves provided in its outer surface. The grooves are spaced circumferentially spaced apart around the outer surface of the locking pin.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein:

FIG. 1 is a cross-sectional view of a portion of a lock nut arrested to a threaded shaft ether with an enlarged portion of the locking mechanism;

FIG. 2 is a side view of the locking pin forming part of the lock nut, and

FIG. 3 is a slightly enlarged end view of the locking pin.

DETAILED DESCRIPTION OF THE INVENTION

Generally speaking, the lock nut of the present invention includes a threaded main bore for receiving a threaded portion and a number of oblique bores in each of which is positioned a locking pin having a forward end for engagement against the threaded portion. The oblique bore and the associated locking pin have a common longitudinal axis extending at substantially the same angle to the axis of the threaded main bore as one of the flanks of the thread of the threaded main bore so that the forward end of the lock nut has at least one flank substantially parallel to the longitudinal axis and lying substantially parallel to the portions of the one flank of the threaded main bore adjacent the inner end of the oblique bore. Each locking nut is generally cylindrical in shape and possesses an outer surface that is grooved or serrated to facilitate insertion of the locking nut into the respective oblique bore.

Referring initially to FIG. 1, a shaft 1 is provided with a threaded portion 2. A machine member 3 is locked to the shaft 1 by way of a lock nut 4 in accordance with the present invention. The thread of the threaded portion of the shaft is defined by flanks as seen in FIG. 1.

The lock nut 4 has an internal main bore possessing an internal thread 5 that is complementary to the external thread of the threaded portion 2. A plurality of evenly spaced apart through bores 6 are positioned around the circumference of the lock nut 4. The through bores 6 project from the outside of the lock nut to the main bore. These bores 6 are obliquely oriented and have an inclination such that the longitudinal axes of the bores 6 are substantially parallel to one flank 7 of the thread in the threaded portion 2 as shown in FIG. 1. Each oblique bore 6 has a first portion 6a located at the inner part of the bore and a second portion 6b forming an outer part of the bore. The first portion 6a of the bore is smooth while the second portion 6b of the bore is threaded. The thread forming the threaded second portion 6b of each bore 6 is defined by flanks as shown in FIG. 1

A substantially cylindrical locking pin 8 is positioned in the first portion or inner portion 6a of each oblique bore 6. With the aforementioned inclination of the bore 6, the side wall of the locking pin 8 coincides with or is substantially parallel to one flank of the thread in the threaded portion 2.

By inserting the looking pins 8 in the oblique bores 6 before the internal thread 5 is cut in the lock nut 4, a thread formation with locking faces 9 is cut in the forward or inner end of the locking pin 8 during the same machining operation in which the internal thread in the lock nut is cut. These locking faces thus match that of the threaded portion 2.

A grub screw 10 or the like is positioned in the second portion or outer portion 6b of the oblique bore 6. By tightening the grub screw 10 in the threaded portion 6b of the oblique bore, the locking pin 8 is urged against the threaded portion 2. As the locking faces of the thread formation of the locking pins 8 in this position are pressed against the flanks of the threaded portion 2, the lock nut 4 is secured to the threaded portion 2 of the shaft 1, and the locking effect is provided entirely by friction forces between the locking faces 9 and the threaded portion 2.

FIG. 2 shows one of the locking pin 8 in a planar side view while FIG. 3 shows the same locking pin 8 in an end view. The locking pin 8 here is shown before it has been machined during the thread cutting operation for the interior thread of the lock nut 4. As can be seen, the basic form is substantially a cylinder, having chamfered end portions 11. In addition, rather than having a smooth outer surface, the cylinder or locking pin has a number of axially extending and circumferentially arranged grooves or serrations 12. In the illustrated embodiment, these grooves or serrations 12 are evenly spaced along the circumferential direction of the cylinder or locking pin 8.

Rather than being made from brass material, the locking pins 8 according to the present invention is manufactured from sintered steel, preferably soaked with a friction reducing lubricant at manufacture. The sintered material is preferably steel. Such locking pins 8 can be inserted in their respective oblique bores much easier than the known brass pin with its smooth external surface. This is due at least in part to the fact that the friction is reduced substantially because the contact between the locking pin 8 and its bore is not over the entire surface but just over the outer linear areas of the serrated surface.

Soaking and impregnating the sinter material locking pin with lubricant also helps reduce the friction between the locking pin 8 and its bore 6a, thereby facilitating insertion of the pin in position. The ridges of the serration 12 furthermore will prevent the pin from rotating in the bore, thereby ensuring that the pin is in the correct position during and after cutting of the thread formation, and remains in the correct position. Additionally, the chamfers 11 at each side or end face of the locking pins 8 further facilitate correct insertion of the locking pin in the oblique bore.

According to a preferred form of the invention, the lock nut 4 is provided with three evenly spaced apart oblique bores, each receiving an associated locking pins 8.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A locking nut having a threaded main bore for receiving a threaded portion, the threaded main bore having an axis, with the thread of the threaded main bore being defined by flanks, the locking nut including a plurality of oblique bores in each of which is positioned a respective locking pin having a forward end adapted to engage against the threaded portion, the forward end of the locking pin having at least one flank, each oblique bore and the respective locking pin having a common longitudinal axis extending at substantially the same angle to the axis of the threaded main bore as one of the flanks of the thread of the threaded main bore so that the least one flank of the locking pin at the forward end of the locking pin is substantially parallel to said longitudinal axis and lies substantially parallel to portions of said one flank of said threaded main bore adjacent an inner end of the oblique bore, the locking pin being a substantially cylindrical body having along its outer surface a plurality of evenly spaced apart axially extending serrations that facilitate introduction of the locking pin into its respective bore, the locking pin being manufactured from sintered material.

2. The locking nut according to claim 1, wherein the sintered material of the locking pin is impregnated with a friction reducing lubricant.

3. The locking nut according to claim 1, wherein the locking pin is manufactured from steel.

4. A combination of a shaft, a machine member and a locking nut that locks the machine member to the shaft, the locking nut having a main bore provided with an internal thread defined by flanks, at least a portion of the shaft being positioned in the main bore so that an external thread on the shaft engages the internal thread of the main bore, the locking nut including at least one through bore that is obliquely oriented relative to the main bore and that opens into the main bore, the through bore having an unthreaded first bore portion and a threaded second bore portion, the first bore portion being located between the main bore and the second bore portion, a locking pin positioned in the first portion of the through bore and having a forward end that engages the externally threaded portion of the shaft, the forward end of the locking pin having a thread defined by flanks, at least one flank of the thread of the locking pin at the forward end of the locking pin being substantially parallel to one flank of the threaded main bore adjacent an inner end of the oblique bore, the locking pin being substantially cylindrical and having a plurality of circumferentially spaced apart and axially extending grooves provided in its outer surface, and a screw positioned in the through bore and threadably engaging the second portion of the through bore for urging the locking pin towards the shaft, the locking pin being manufactured from sintered material.

5. The combination according to claim 4, wherein the sintered material of the locking pin is impregnated with a friction reducing lubricant.

6. The combination according to claim 4, wherein the locking pin is manufactured from steel.

7. The combination according to claim 4, wherein the serrations are evenly spaced apart circumferentially around the locking pin.

8. A locking nut which locks a machine member to a shaft, the shaft having an externally threaded portion, the locking nut having a main bore in which is positioned the externally threaded portion of the shaft, the main bore including a thread defined by flanks, the locking nut including at least one oblique bore in which is positioned a locking pin having a forward end that engages against the externally threaded portion of the shaft, the forward end of the locking pin having a thread defined by flanks, the oblique bore and the locking pin having a common longitudinal axis extending at substantially the same angle to the axis of the threaded main bore as one of the flanks of the thread of the threaded main bore so that at least one flank of the thread of the locking pin at the forward end of the locking pin is lies substantially parallel to portions of said one flank of said threaded main bore adjacent an inner end of the oblique bore, the locking pin being substantially cylindrical and having a plurality of axially extending grooves provided in its outer surface, the grooves being spaced circumferentially spaced apart around the outer surface of the locking pin, the locking pin being manufactured from sintered material.

9. The locking nut according to claim 8, wherein the sintered material of the locking pin is impregnated with a friction reducing lubricant.

10. The locking nut according to claim 8, wherein the locking pin is manufactured from steel.

11. The locking nut according to claim 8, wherein the serrations are evenly spaced apart circumferentially around the locking pin.

\* \* \* \* \*